(12) United States Patent
Hall et al.

(10) Patent No.: US 11,607,938 B2
(45) Date of Patent: Mar. 21, 2023

(54) TRUCK CAP LIFTING KIT

(71) Applicant: Hall Labs, LLC, Provo, UT (US)

(72) Inventors: David R. Hall, Provo, UT (US); Casey Webb, Spanish Fork, UT (US); Doug Mecham, Provo, UT (US)

(73) Assignee: Hall Labs LLC., Provo, UT (US)

( * ) Notice: Subject to any disclaimer, the term of this patent is extended or adjusted under 35 U.S.C. 154(b) by 481 days.

(21) Appl. No.: 16/404,742

(22) Filed: May 7, 2019

(65) Prior Publication Data
US 2021/0039486 A1 Feb. 11, 2021

(51) Int. Cl.
*B66D 1/36* (2006.01)
*B66D 3/04* (2006.01)
*B60J 7/10* (2006.01)
*B60R 9/042* (2006.01)

(52) U.S. Cl.
CPC ............. *B60J 7/106* (2013.01); *B60R 9/042* (2013.01); *B66D 1/36* (2013.01); *B66D 3/04* (2013.01)

(58) Field of Classification Search
CPC .............. B66D 3/04; B66D 1/36; B60J 7/106; B60R 9/04; B60R 9/042
See application file for complete search history.

(56) References Cited

U.S. PATENT DOCUMENTS

| | | | | |
|---|---|---|---|---|
| 4,248,558 A | * | 2/1981 | Lechner | B60P 7/0815 410/104 |
| 4,469,261 A | * | 9/1984 | Stapleton | B60R 9/045 410/104 |
| 5,259,711 A | * | 11/1993 | Beck | B60P 7/0815 410/104 |
| 5,984,275 A | * | 11/1999 | Hoslett | B66D 3/04 254/338 |
| 6,152,427 A | * | 11/2000 | Hoslett | B66C 1/16 254/338 |
| 6,305,589 B1 | * | 10/2001 | Chimenti | B60R 9/045 224/326 |
| 6,386,515 B1 | * | 5/2002 | Sachtleben | B66D 1/04 254/338 |
| 6,585,465 B1 | * | 7/2003 | Hammond | B60P 7/0815 410/104 |
| 6,827,531 B2 | * | 12/2004 | Womack | B60P 7/0815 410/104 |
| 6,846,140 B2 | * | 1/2005 | Anderson | B60P 7/0815 410/112 |
| 6,959,918 B1 | * | 11/2005 | Samuels | B66D 3/04 254/338 |
| 7,156,593 B1 | * | 1/2007 | Saward | B60P 7/0815 410/104 |

(Continued)

*Primary Examiner* — Frederick L Lagman

(57) ABSTRACT

The invention is a kit for attaching to a truck cap to enable the cap to be lifted off of and lowered onto a truck by lines from above. The kit includes: a first rail and a second rail, each configured to attach to the truck cap; a first pair of sliding masts for releasably attaching to the first rail and a second pair of sliding masts for releasably attaching to the second rail. Each of the sliding mast includes: a sled which is captured by the rail, and is slidable along the rail, and is adapted to be secured at various points along the rail; and a brace with one end attached to the sled and the other end adapted to receive one of the lines. In another aspect, the kit includes multiple lifting devices.

20 Claims, 7 Drawing Sheets

(56) References Cited

U.S. PATENT DOCUMENTS

| | | | | |
|---|---|---|---|---|
| 8,591,156 B2* | 11/2013 | Grone | ................ | B60P 3/07 410/104 |
| 2004/0134951 A1* | 7/2004 | Allen | ................ | B60R 9/045 224/326 |
| 2021/0372189 A1* | 12/2021 | Hall | ................ | E05F 15/73 |

* cited by examiner

TRUCK CAP LIFTING KIT

TECHNICAL FIELD

This invention relates generally to the field of storage, and more specifically to overhead storage.

BACKGROUND

Pickup trucks are versatile vehicles suited to a variety of activities. A truck cap which covers the bed of the truck can add functionality to the pickup truck. The cap is useful for protecting items in the truck bed from the elements. The cap also conceals the contents of the truck bed. However, there are times when a cap inhibits the usefulness of a truck. For example, transporting large items that fit within the truck bed but not underneath the cap. Truck caps are unwieldly an removing them generally requires multiple people. There is also the matter of where to store the cap while it is not in use on the truck.

SUMMARY

In a first aspect, the disclosure provides a kit for attaching to a truck cap to enable the cap to be lifted off of and lowered onto a truck by lines from above. The kit includes: a first rail and a second rail, each configured to attach to the truck cap; a first pair of sliding masts for releasably attaching to the first rail and a second pair of sliding masts for releasably attaching to the second rail. Each of the sliding mast includes: a sled which is captured by the rail, and is slidable along the rail, and is adapted to be secured at various points along the rail; and a brace with one end attached to the sled and the other end adapted to receive one of the lines.

In a second aspect, the disclosure provides a kit for lifting a truck cap off of and lowering the truck cap onto the truck. The kit includes; multiple lifting devices; each lifting device includes; a drum for winding and unwinding a line, a motor and transmission coupled to the drum to apply a torque thereto, a guide to direct the line onto the drum, and a controller. The kit also includes; a first rail and a second rail, a first pair of sliding masts for releasably attaching to the first rail and a second pair of sliding masts for releasably attaching to the second rail, each sliding mast includes; a sled captured by the rail and sliding along the rail, and adapted to be secured at various points along the rail and a brace with one end attached to the sled and the other end adapted to receive the line of one of the lifting devices. The multiple lifting devices raise and lower the truck cap.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "truck cap" is meant to refer to coverings for the bed of a pickup truck. Truck and pickup truck are used interchangeably throughout the detailed description.

As used herein, "mobile device" is meant to refer to mobile general-purpose processing devices, such as a smartphone, tablet, or laptop.

A truck cap can add to the functionality of a pickup truck. However, there are instances when removing the cap is necessary. At other times the owner of the truck may simply want to drive the truck without the cap. To enable a truck owner to remove or install a truck cap without the assistance of others a hoisting system has been developed.

Figure 1:
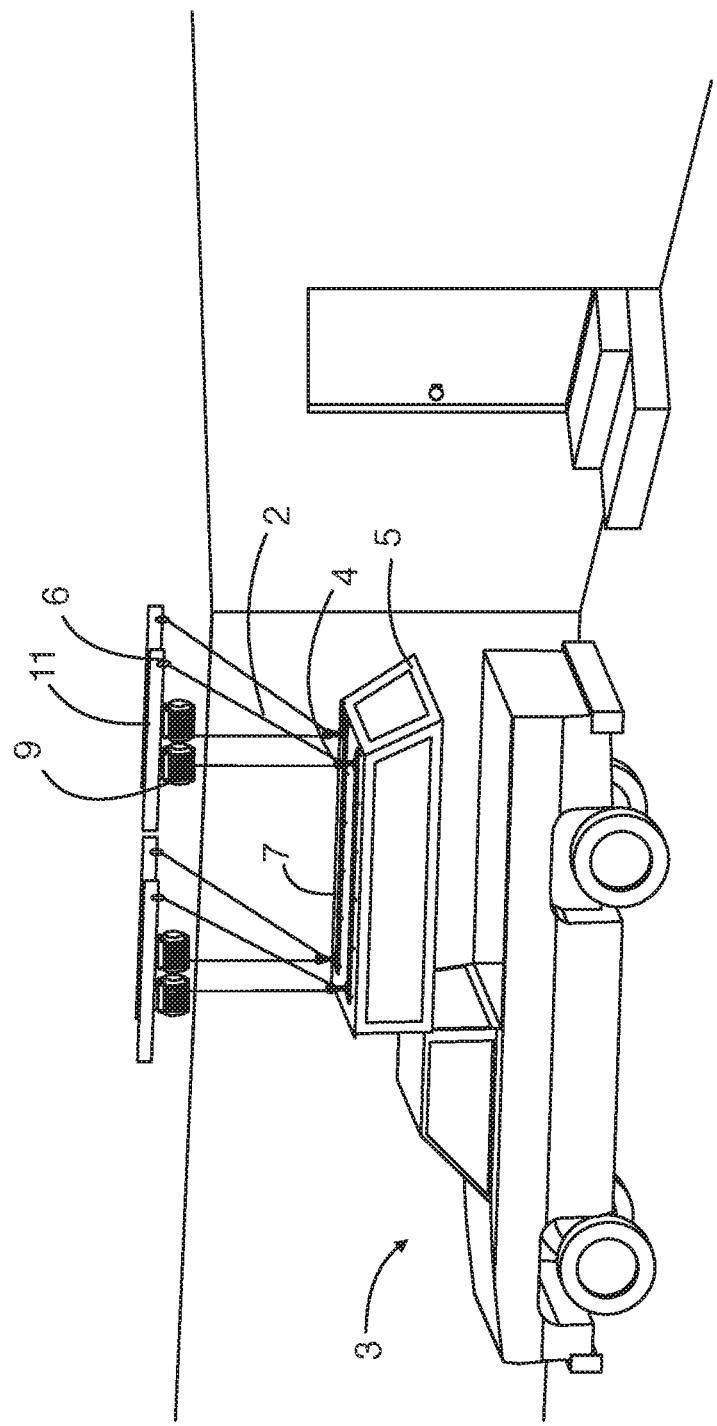
FIG. 1 is an embodiment showing the invention lifting a truck cap from the truck.

Turning to FIG. 1, the truck is backed into a garage where lifting devices, for example lifting device 9, are attached to rails, for example rail 7 installed on the truck cap 5. The lifting device 9 is installed on an overhead mounting system (such as that described in U.S. Pat. No. 9,939,105, the contents of which are incorporated herein by reference). The lifting device 9 includes a line 2 which spools onto and off of the lifter 9. The line 2 engages a pulley 4 which is part of a sliding mast attached to rail 7. By utilizing pulleys, the force necessary for the lifting devices to raise the truck cap is reduced. This creates less wear on the lifting devices and can extend their usable life. The line 2 engages pulley 4 and the end of the line 2 is attached to the overhead mounting system by carabiner 6. In other embodiments, the line is attached to the overhead mounting system by bins, bolts, screws, or other attachment mechanisms. The carabiner 6 allows the line 2 to be easily moveable and removable. The overhead mounting system is designed to allow the end of the line 2 to be placed at various points along the overhead mounting system. In other embodiments, the end of the line attaches to the lifting apparatus directly. In such an embodiment, the pulleys are not used, and the lifting devices lift the full weight truck cap. In some embodiments, the line is attached to the lifting apparatus by bolts, pins, screws, or other attachment mechanisms. With the lifter 9 attached to the rail 7. The truck cap 5 is ready to be lifted off the truck 3.

Figure 2:
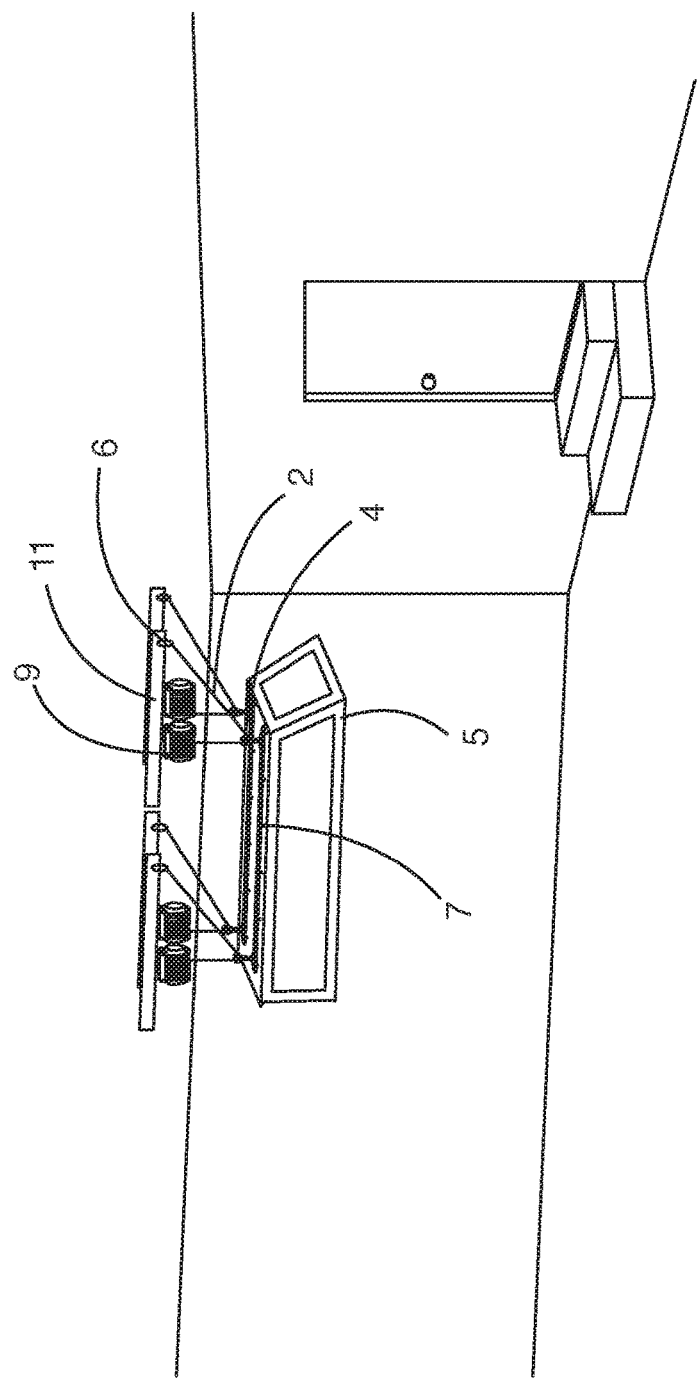
FIG. 2 is an embodiment showing the truck cap being stored.

The lifters 9 raise the cap 5 to a suitable storage height, as seen in FIG. 2. In general, this will allow people to walk under the cap 5 as it is held in place by the lifters.

The lifting devices are also configured to lower the truck cap onto the truck so that it can be used again. To lower the truck cap the lifting devices will unspool the line, this will extend the line and lower the truck cap.

Figure 3:
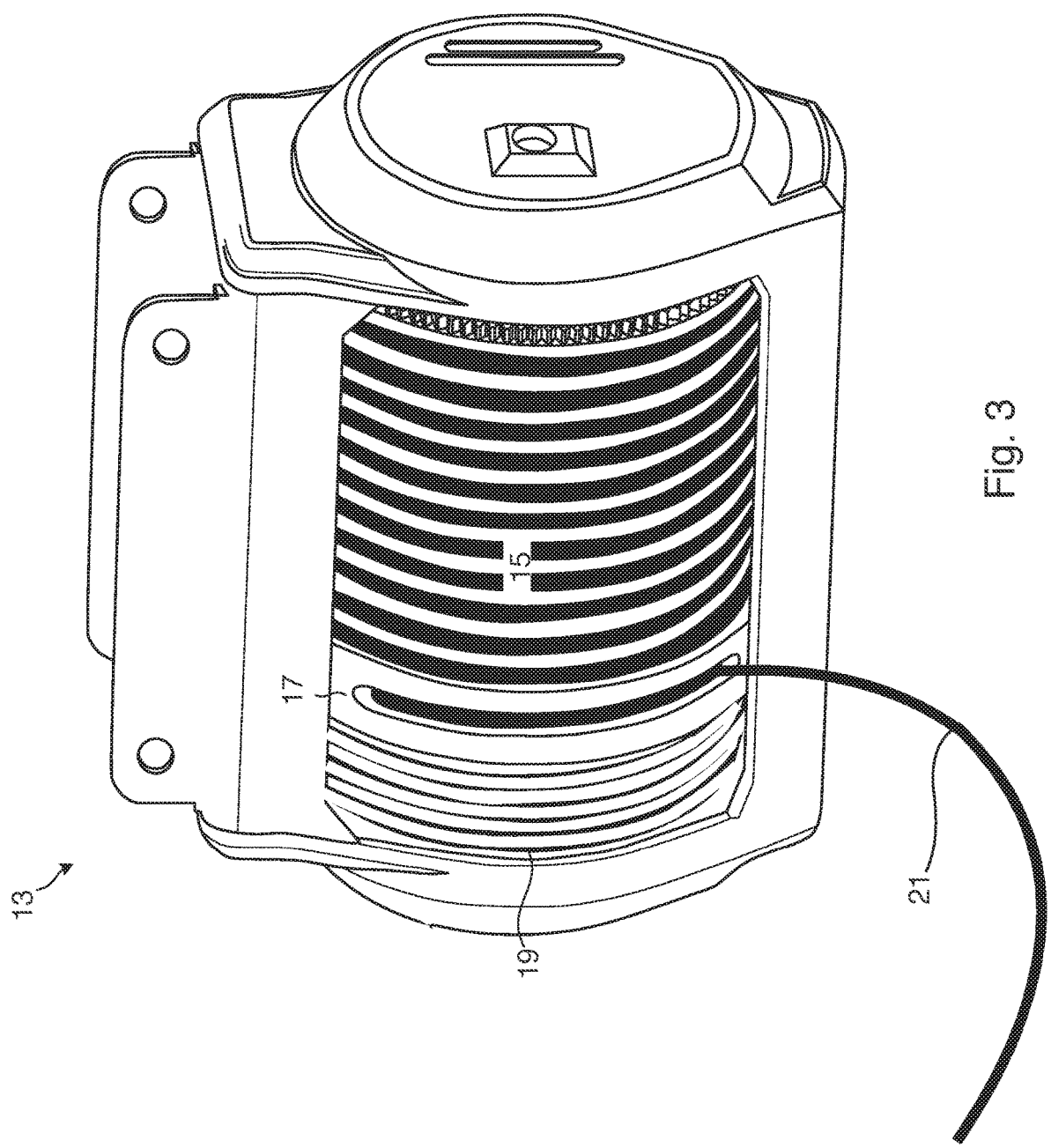
FIG. 3 is an embodiment of a lifting device.

FIG. 3 shows a lifting device. The preferred lifting device is one of the lifting devices described in U.S. Pat. Nos. 9,399,566, 9,567,194, 9,873,600, 9,908,754, 9,988,250, 9,975,745, 9,988,251 the entire contents of which are incorporated herein by reference. These lifting devices are available from GarageSmart under the brand "MyLifter®." A simplified description of one such lifting device follows. The lifting device 3 has a grooved drum 19 on which a line 21 is would. The lifting device also includes a guide 17 for winding the line on the drum. The drum 15 of the lifting device spools and unspools the line 21. The motor and transmission are located within the drum. The lifting device is also equipped with a controller. Preferably, the controller is assembled on a printed circuit board (PCB) and includes a wireless transmitter, a processor and memory. The wireless transmitter of the controller connects the lifting device to a mobile device. The mobile device is configured to run an app for controlling the lifting device. Through the app the controller causes the motor to turn the drum. As the drum turns in one direction, the line unspools from the drum of the lifting device. As the drum spools in the other direction, the line spools onto the drum of the lifting device.

To enable the truck cap to be lifted in a level manner, the lifting devices need to coordinate their actions so that they spool their lines in at the same speed. The lifters are programmed with certain functionalities as to enable the lifters to function as a group (such as those described in U.S. Pat. No. 10,280,051, the contents of which are incorporated by reference)

A summary of such functionalities follows. Multiple motorized lifting devices are configured to lift a shared load, such as a truck shell. When using multiple synchronizing motorized lifting devices to lift a shared load, apparatus and methods are needed to ensure that the motorized lifting devices stay synchronized. For example, if one motorized lifting device were to stop while the other motorized lifting devices continued raising or lowering a load, the cap could tip, potentially creating a safety hazard. A similar situation could occur if some motorized lifting devices were to move faster or slower than others.

As will be explained in more detail hereafter, in certain embodiments a grouping module is used to group motorized lifting devices for synchronized operation and a synchronization module is used to keep the group of motorized lifting devices synchronized with one another. Once grouped, the motorized lifting devices operate as a single device.

In certain embodiments, the grouping module and synchronization module are implemented in the motorized lifting devices. In other embodiments, the grouping module and synchronization module are implemented in a controller which will be discussed later. In other embodiments, the grouping and synchronization modules are distributed between the controller and the motorized lifting devices. In general, the synchronization module monitors the operating parameters (position of the line, speed, etc.) of the motorized lifting devices in the group and adjust the operating parameters to keep the motorized lifting devices substantially synchronized.

In certain embodiments, a synchronization module in accordance with the invention is configured to identify a slowest moving motorized lifting device in a group and then adjust the other motorized lifting devices in the group to keep pace with the slowest motorized lifting device. For example, when the group of motorized lifting devices is lifting a truck shell and the synchronization module detects (by requesting or periodically receiving data, etc.) that one of the motorized lifting devices in the group is lifting or lowering the load slower than the others the synchronization module adjusts (by sending commands, etc.) the speed of the other motorized lifting devices to match the speed of the slowest motorized lifting device. Similarly, if the synchronization module detects that an amount of line let out from each of the motorized lifting devices is causing the truck cap to tilt, the synchronization module adjusts the amount of line let out from each of the motorized lifting devices to level out the cap. Similarly, if the synchronization module detects that one of the motorized lifting devices has stopped (due, for example, to a power outage or an overload condition) or loss of communication, the synchronization module causes the other motorized lifting devices to stop, thus maintaining the cap level to prevent safety hazards.

As previously mentioned, the motorized lifting devices are configured to raise or lower a truck shell. Various controls may be provided with the motorized lifting devices to enable a user to raise or lower the cap. For example, the controls may provide a "lift" and "lower" button that when pressed causes an end of the line to go up and down respectively.

It will generally be more desirable for the motorized lifting devices to establish various set points for the motorized lifting devices and have the motorized lifting devices automatically stop at these set points as it raises or lowers the truck cap. For example, it would be useful to establish stopping points such as: when the cap is at a safe height, and when the cap is resting on the truck bed. In certain embodiments, the user establishes the set points by raising or lowering the line and selecting an option to store or remember the position of the line at each stop. Once the set points are established, a user presses a "smart lift" or "smart lower" button to cause the motorized lifting devices to raise or lower the line to the next set point, without requiring the user to hold down the button or be present.

Figure 4:
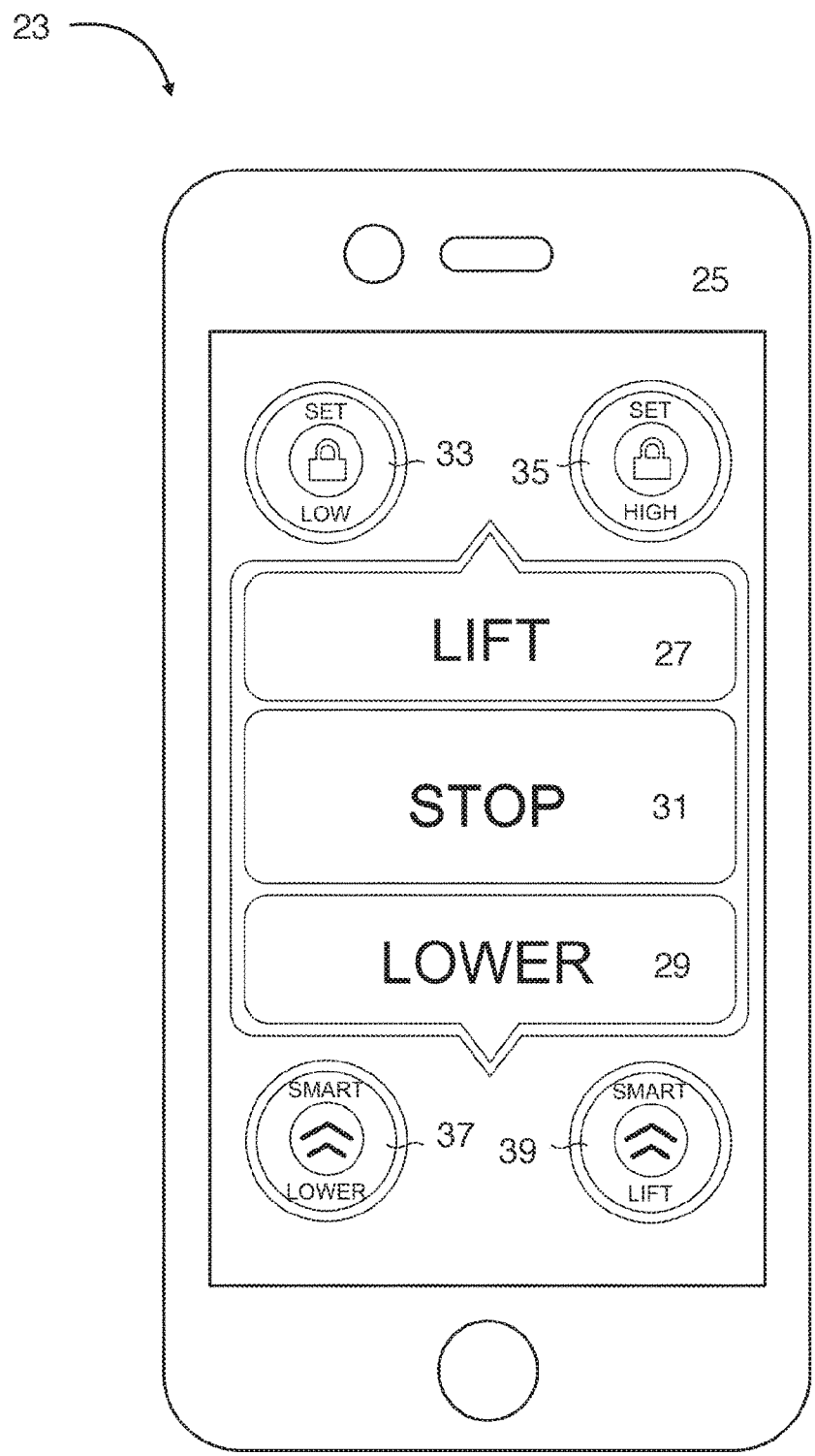
FIG. 4 is an embodiment of a control device.

Referring to FIG. 4, one embodiment of a controller for performing the functions such as lifting and lowering is depicted. In this example, such a controller is embodied as an application executing on a smartphone 23. In other embodiments the application is executed on other mobile general-purpose processing devices, such as a tablet, or laptop. As shown in FIG. 4, in certain embodiments, the application includes a user interface 25 providing various controls. It is possible for a user interface to take on many forms and thus is presented by way of example and not limitation. It should be recognized that the user interface 25 often includes other pages, windows, menus, or the like, and thus is not intended to reflect the complete functionality of the application.

In certain embodiments, the user interface 25 includes one or more of the following virtual buttons for operation by a user: a "lift" button 27, a "lower" button 29, and a "stop" button 31. Pressing the "lift" button 27 causes the motorized lifting devices to raise the line until the button is released or until the line reaches an upper limit or stop point. Similarly, pressing the "lower" button 29 causes the motorized lifting devices to lower the line until the button is released or the line reaches a lower limit or stop point. Pressing the "stop" button 31 causes the motorized lifting devices to stop.

The depicted user interface 25 also includes buttons that enable the motorized lifting devices to function in a more intelligent manner. For example, the user interface 25 includes functionality enabling a user to establish various set points for the motorized lifting devices and have the motorized lifting devices automatically stop at these set points as it raises or lowers the truck cap. For example, a "set low" button 33 establishes a low set point at a user determined location of the line. Generally, this low set point will be at the point where the cap is resting on the bed of the truck. When the line is at desired location the user presses and holds the set low button, thus establishing the set low location. This location can be "locked" so that the location is not accidentally reset. Similarly, a "set high" button 35 establishes a high set point at a user determined location of the line. When the line is at desired location the user presses and holds the set high button, thus establishing the set high location. This location can be "locked" so that the location is not accidentally reset.

A "smart lower" button 37 causes the motorized lifting device to lower the line until it reaches the low set point and a "smart lift" button 39 causes the motorized lifting device to raise the line until it reaches the high set point. In other embodiments, the user interface 25 is configured to enable a user to establish other intermediate set points in addition to the high and low set points. Unlike the "lift" button 27 and the "lower" button 29, a user is not be required to hold down the "smart lower" button 27 or "smart lift" button 29 to perform the associated functions.

Figure 5:
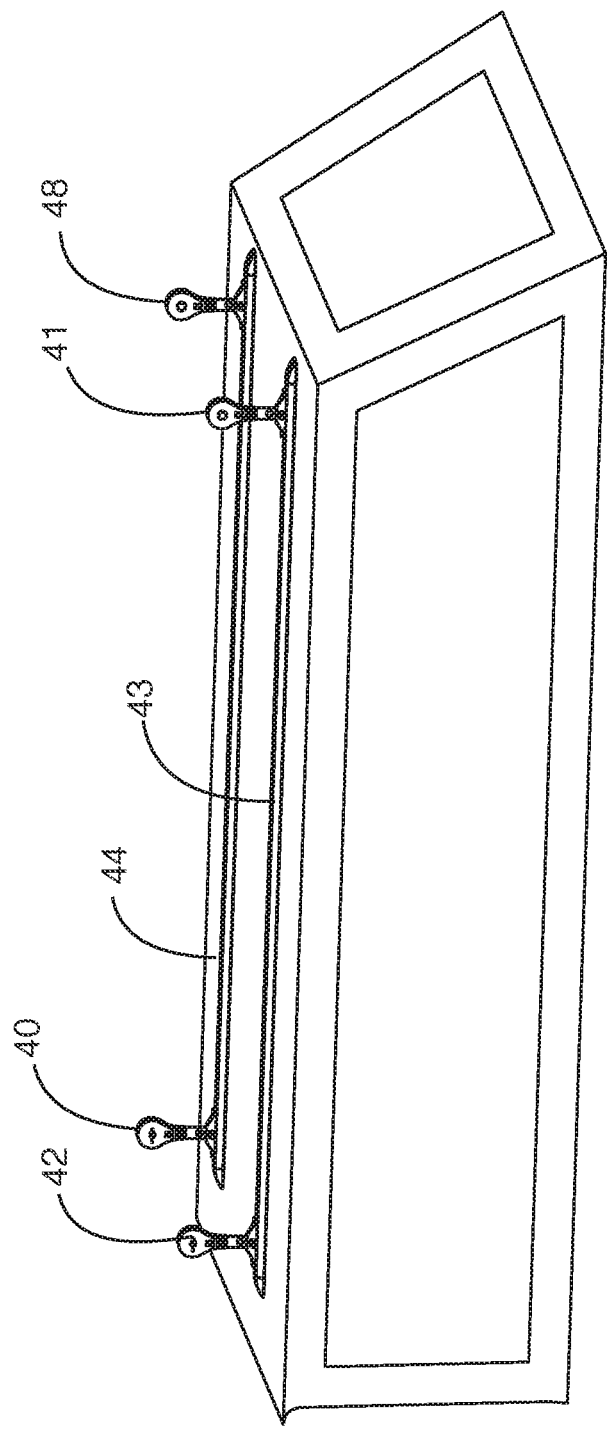
FIG. 5 is an embodiment showing the rails attached to a truck cap.

To enable the lifting devices to lift the truck cap, the line of the lifters needs to attach to the truck cap. In one embodiment, the line of the lifters attaches to sliding masts. The sliding masts fit within and slide on rails installed on the truck shell. FIG. 5 shows the rails 43 and 44 attached to the truck shell along with the sliding masts 40, 41, 42, and 48 positioned in the rails. Typically, two rails are attached to the truck cap. Preferably, a pair of sliding masts are attached to and positioned along each rail. In other embodiments, more rails are used along with more sliding masts. In certain embodiments, a single sliding mast is attached to and positioned within each rail. In still other embodiments, more sliding masts are attached to and positioned within the rails. It some embodiments, this will be 3, 4, or even more sliding masts attached to and positioned along each rail.

Figure 6:
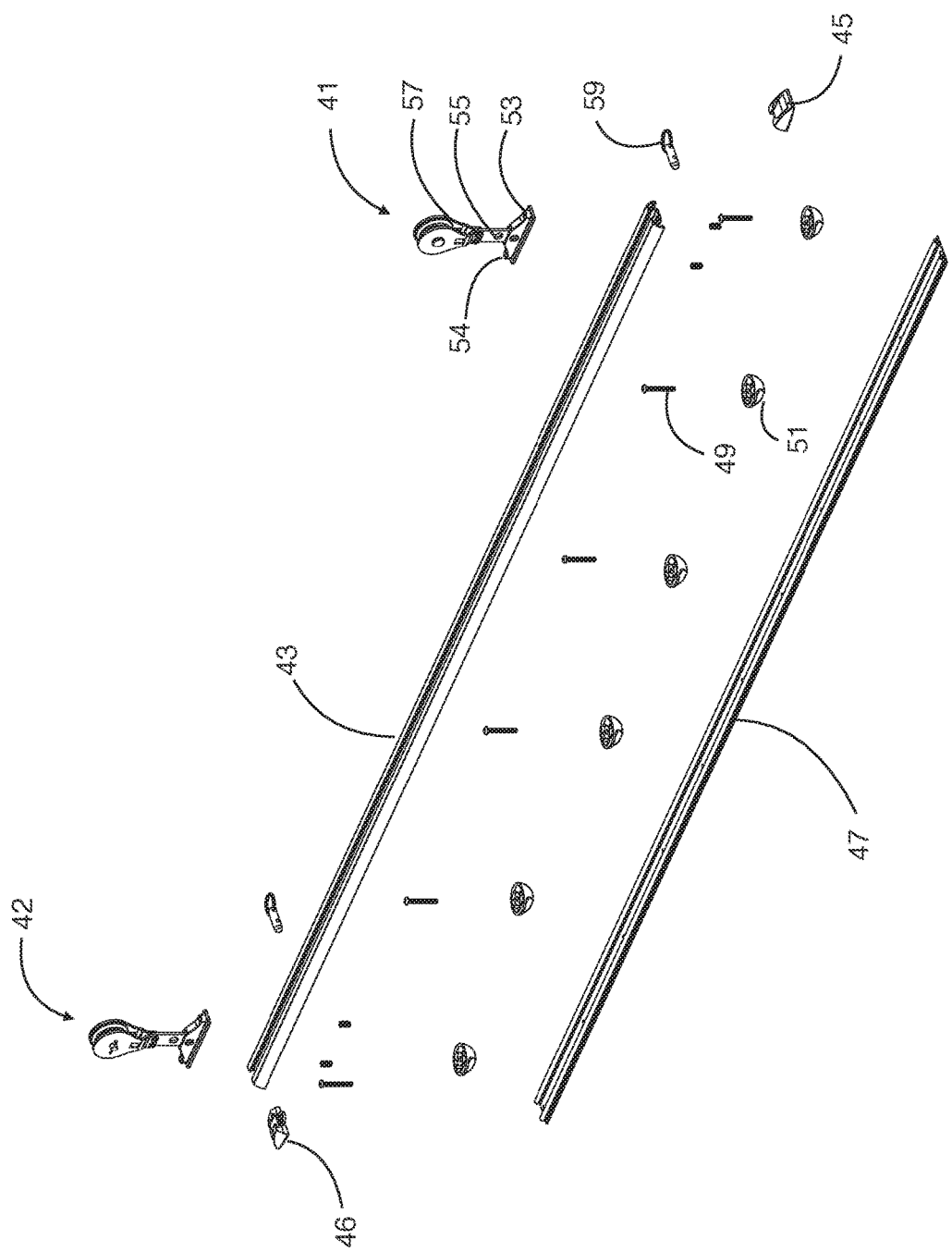
FIG. 6 is an embodiment showing an exploded view of the rail attachment assembly.

FIG. 6 shows an exploded view of the rail assembly along with the sliding masts. The rail 43 is attached to a truck cap by bolts, for example, bolt 49 secured with nuts, for example, nut 51. The rail 43 includes a channel. At either end of the rail 43 are rail end caps 45, and 46. The rail end caps 45 and 46 are configured to allow the sliding masts 41 and 42 to slide off the rail 43. Allowing the sliding masts 41 and 42 to slide completely off the rail 43 enables other components to slide onto the rail 43. This is especially useful for attaching equipment carrying racks, for example, racks for carrying skis or bicycles. With the sliding masts removed the equipment carrying rack has full range of adjustment over the whole length of the rail 43.

In many embodiments, the rail assembly includes a strip of pliable waterproof material 47 designed to fit between the rail 43 and a truck shell. This strip of pliable waterproof material 47 is preferably silicone (sometimes called silicone rubber) and prevents water from entering the truck cap. In other embodiments the strip is made from materials such as rubber, foam, polytetrafluoroethylene (PTFE), or other materials.

In certain embodiments, the sliding masts 41 and 42 are made of several components. For example, in some embodiments, the sliding mast 41 is made of a pulley 57 connected by a brace 55 to a sled 53. The pulley 57 engages with the line of the lifting device. Each pulley engages with the line of a corresponding lifting devices. Typically, the line of each lifting device will attach to the overhead mounting system with carabiners, with the lines running through the pulleys enabling the pulleys to engage the line. Other attachment mechanisms are used in other embodiments, for example; quick links, bolts, or pins. Each pulley assists in the raising and lowering of the truck cap. The use of pulleys creates a mechanical advantage that lessens the amount of force needed to raise the tuck cap. In other embodiments the sliding masts do not include pulleys, the lines of the lifting devices attach to the sliding masts by carabiner, bolt, pin or other attachment mechanisms. The pulley 57 is connected to the brace 55 in some embodiments by bolts, while in others they are connected with rivets. The brace 55 fits within an opening in the sled 53 and they are secured together with a pin 59, in certain embodiments. In other embodiments, the sled and brace are secured together by bolts or rivets. It is often advantageous to remove the pulley 57 and brace 55 of the sliding mast while leaving the sled 53, for this reason the preferred embodiment for securing the brace 55 to the sled 57 is with a removable pin 59.

The sled 53 is designed to fit within and slide along the rail 43. In some embodiments, the sled is designed to be fixed in place. This helps ensure that the truck cap will not shift while being stored leads to safer lifting of the truck cap. In certain embodiments, the sled is fixed in place by turning a screw 54. Turning the screw 54 pushes the sled 53 against the rail 43. The friction caused by this keeps the sled 53 in place.

The rail assembly is generally used for lifting and securing a truck cap, therefore it must be strong enough to hold the weight of the truck cap but light enough to enable the lifters to lift. The components of the rail assembly are generally composed of strong yet lightweight materials. In most embodiments the rail 43 is made of steel. This can be steel with a coating such as a powder coat or an electrochemical coating such as galvanization or particle vapor deposit (PVD). It can also be stainless steel. In other embodiments, the rail 43 is made from other metals such as aluminum or titanium. In other embodiments the rail is made from composite materials such as carbon fiber, or plastic. The rail caps 45 and 46 are often made from composite materials such as plastics. In other embodiments they are made from metals. The sled 53 of the sliding mast 41 is preferably made from a lightweight metal such as aluminum. In other embodiments, it is made from other metals such as steel, or from composite materials.

To install the rail assembly holes are drilled into the truck cap. The rail 43 comes with the holes already drilled. The rail 43 is placed on the cap and used as a template to drill the holes for securing the rail assembly to the cap. When drilling the holes in the truck cap the strip of pliable waterproof material 47 is placed between the rail 43 and the roof of the truck cap. Pilot holes are drilled through the strip of pliable waterproof material 47. When the bolts are threaded through the rail 43, the strip of pliable waterproof material 47, and the truck cap, the bolt "gathers" some of the strip of pliable waterproof material 47 in the treads and pulls the material into the holes in the truck cap.

Figure 7:
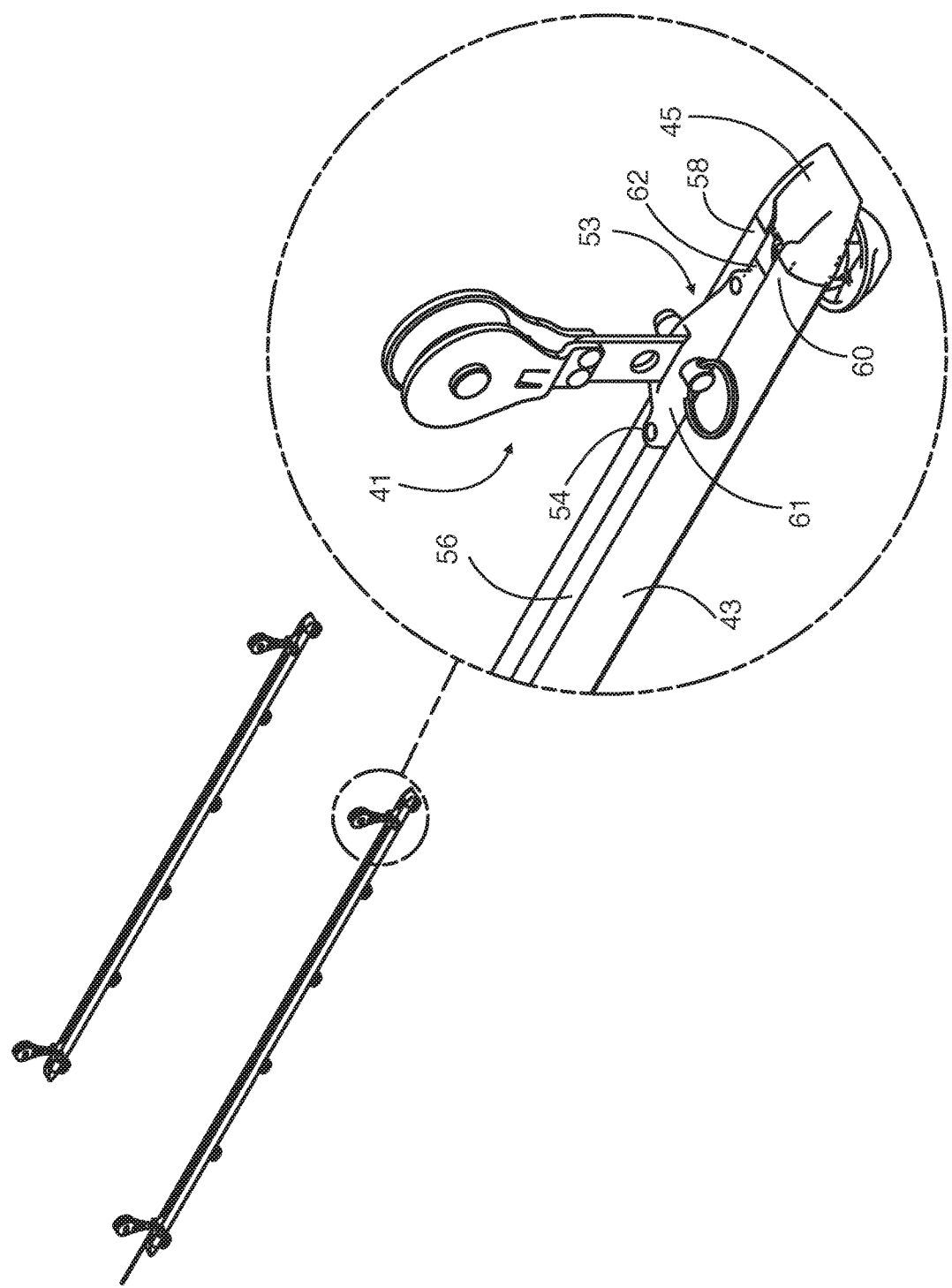
FIG. 7 depicts the same embodiment as FIG. 6 and includes a close-up view of the rail and sliding mast.

FIG. 7 shows a close-up view of the rail 43 and sliding mast 41. Rail 43 includes a channel 56 with overhanging sides 58 and 60. The overhanging sides 58 and 60 are designed to keep objects within the rail. For example, the sled 53 of sliding mast 41, includes rims, such as rim 62. The rims fit beneath the overhanging sides 58 and 60 of rail 41. The body 61 of sled 53 protrudes from the channel 56 of rail 43. The rims, such as rim 62, of the sled keep the sled 53 securely within the rail 43. The body 61 of sled 53 is raised above the overhanging sides 58 and 60 where it can attach to other components, for example bracket 55. Bracket 55 attaches the sled 53 to pulley 57. When lifting the truck cap, it is preferable that the sled 53 not slide along rail 43. In most embodiments, the sled 53 includes a screw 54. The screw 54 is tightened to secure the sled 53 in place.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A kit for attaching to a truck cap to enable the cap to be lifted off of and lowered onto a truck by lines from above, the kit comprising:
   a first rail and a second rail, each configured to attach to the truck cap;
   a first pair of sliding masts for releasably attaching to the first rail and a second pair of sliding masts for releasably attaching to the second rail, each sliding mast comprising:
   a sled captured by the rail, slidable along the rail, and adapted to be secured at various points along the rail;
   a brace with one end attached to the sled and the other end adapted to receive one of the lines;
   wherein the brace of each sliding mast is configured to detach from the corresponding sled of each sliding mast while leaving each of the sleds within the rail.

2. The kit of claim 1, wherein each of the multiple sliding masts further comprise a pulley.

3. A kit for attaching to a truck cap to enable the cap to be lifted off of and lowered onto a truck by lines from above, the kit comprising:
   a first rail and a second rail, each configured to attach to the truck cap;
   a first pair of sliding masts for releasably attaching to the first rail and a second pair of sliding masts for releasably attaching to the second rail, each sliding mast comprising:
   a sled captured by the rail, slidable along the rail, and adapted to be secured at various points along the rail;
   a brace with one end attached to the sled and the other end adapted to receive one of the lines;
   wherein each sliding mast comprises a pulley.

4. The kit of claim 3, wherein the truck cap can be removed from the lines by detaching each brace from its corresponding sled, while leaving each sled within the rail.

5. The kit of claim 3, further comprising end caps designed to allow the sliding masts to slide onto and off of the rails.

6. The kit of claim 5, wherein each of the sliding masts is configured to be removed from the rails by sliding it off the rail.

7. The kit of claim 3, further comprising a screw to lock the sled of each of the sliding masts in place.

8. The kit of claim 3, wherein the rails further comprise a strip of pliable waterproof material configured to fit between the rails and the roof of the truck cap.

9. A kit for lifting a truck cap off of and lowering the truck cap onto the truck, the kit comprising:
   multiple lifting devices, each lifting device comprising:
   a drum for winding and unwinding a line;
   a motor and transmission coupled to the drum to apply a torque thereto;
   a guide to direct the line onto the drum; and
   a controller;
   a first rail and a second rail, each configured to attach to the truck cap;
   a first pair of sliding masts for releasably attaching to the first rail and a second pair of sliding masts for releasably attaching to the second rail, each sliding mast comprising:
   a sled captured by the rail, slidable along the rail, and adapted to be secured at various points along the rail;
   a brace with one end attached to the sled and the other end adapted to receive the line of one of the lifting devices;
   wherein the multiple lifting devices raise and lower the truck cap.

10. The kit of claim 9 wherein each of the multiple sliding masts further comprise a pulley.

11. The kit of claim 9, wherein each sled is removably attached to the brace of each sliding mast.

12. The kit of claim 11, further comprising end caps designed to allow the sliding masts to slide onto and off of the rails.

13. The kit of claim 9, wherein each of the sliding masts is configured to be removed from the rails by sliding it off the rail.

14. The kit of claim 9, further comprising a screw to lock each of the sliding masts in place.

15. The kit of claim 9, wherein the rails further comprise a strip of pliable waterproof material configured to fit between the rails and the roof of the truck cap.

16. The kit of claim 9, wherein the controllers of the lifting devices are configured to communicate with a mobile device.

17. The kit of claim 9, wherein the controllers of the lifting devices are configured to communicate with each other.

18. The kit of claim 17, wherein the lifting devices are configured to act in conjunction.

19. The kit of claim 9, wherein the lifting devices are removably connected to an overhead mounting bracket.

20. The kit of claim 19, wherein the lifting devices are configured to store the truck cap in a suspended condition.

\* \* \* \* \*